United States Patent [19]

Crane

[11] 3,907,583
[45] Sept. 23, 1975

[54] GRINDING RUBBER-REINFORCING CARBONACEOUS PIGMENT WITH SULFUR

[75] Inventor: Grant Crane, Akron, Ohio

[73] Assignee: The Firestone Tire & Rubber Company, Akron, Ohio

[22] Filed: Aug. 16, 1973

[21] Appl. No.: 389,104

[52] U.S. Cl. .................................. 106/307; 106/309
[51] Int. Cl.² .......................................... C09C 1/44
[58] Field of Search ........................... 106/307, 309

[56] References Cited
UNITED STATES PATENTS

| | | | |
|---|---|---|---|
| 2,652,344 | 9/1953 | Simms | 106/307 |
| 3,404,019 | 10/1968 | Golshall | 106/307 |
| 3,442,679 | 5/1969 | Revin et al. | 106/307 |
| 3,528,840 | 9/1970 | Aboytes | 106/307 |
| 3,660,133 | 5/1972 | Van Der Schuyt | 106/307 |

*Primary Examiner*—Winston A. Douglas
*Assistant Examiner*—J. V. Howard

[57] ABSTRACT

Carbonaceous material is ground at an elevated temperature in the presence of sulfur to obtain a rubber-reinforcing black with superior properties as a reinforcing agent in rubbers.

2 Claims, No Drawings

GRINDING RUBBER-REINFORCING CARBONACEOUS PIGMENT WITH SULFUR

This invention relates to the grinding of carbonaceous material in the presence of sulfur, thereby obtaining a product of superior value as a reinforcing agent for rubbers, etc. The invention is applicable in particular to the treatment of such carbonaceous material obtained by calcining scrap vulcanized rubber, particularly scrap tires. The invention includes the products as well as the process.

According to this invention, carbonaceous material capable of being reduced in particle size by grinding, such as coal or coke from coke or charcoal, or petroleum coke, etc., and particularly brittle char from the calcining of vulcanized rubber is ground with sulfur at an elevated temperature such that the sulfur exerts a vapor pressure of at least 1 mm. of mercury and preferably not greater than 760 mm. Preferred conditions are a temperature of about 400° to 800°F. in a fluid-energy mill, in an atmosphere of steam under a pressure of 1 to 2 atmospheres. Just what interaction takes place between the sulfur and the black is not known. Possibly some sulfur vapor permeates the black, and some sulfur is deposited on the surface of the particles of the black. Perhaps some chemical reaction takes place between the sulfur and ingredients in the char. Sulfur, which is quite inexpensive, is easily applied to the black in this way, and contributes to the subsequent vulcanization of the rubber.

The preferred carbonaceous material is prepared by heating scrap rubber, preferably old pneumatic tires (or selected parts of old tires) in the absence of air. Brittle char thus produced can be ground to a black similar to that originally compounded in the rubber. Since, generally, different blacks are used in different parts of a tire, such as the carcass and the tread, it may be desired not to produce the char from a whole tire, but selected parts of scrap tires will be calcined to produce chars capable of being ground to different blacks.

The scrap from which the char can be obtained may be vulcanized natural or synthetic rubber including, for example, polybutadiene, polyisoprene, butadiene or isoprene-styrene copolymer, butyl rubber and an ethylene-propylene copolymer, and may contain nitrile rubber, polyurethane, etc. Such scrap, if obtained from whole tires, may have additional elastomers mixed with it, such as foam rubber, polyurethane, etc. Calcination of scrap rubber is known in the art. The rubber is charred by heating in the absence of air or with a limited air supply. See Destructive Distillation of Scrap Tires by Wolfson, Beckman, Walters and Bennett, published by U.S. Department of the Interior and identified as Report of Investigation 7302. Further treatment may be applied, as by treating with steam to volatize oil remaining on the char and increasing its porosity, or treating with acid to remove mineral matter, etc.

The sulfur treatment is preferably conducted by grinding carbonaceous material in sulfur, and the amount of sulfur used may be deducted from the amount required by the vulcanization formula in which the sulfur-treated black is eventually used. Usually the weight of sulfur applied to the carbonaceous material will be about 0.01 to 10 per cent of its weight.

EXAMPLE

Scrap rubber was passed through a Bartlett-Snow 10-foot rotary calciner at about 1200°F. with the gases and vapors removed concurrent to the flow of the rubber and resulting char. The temperature is not critical, and a temperature of about 800°–1800°F. may be used, depending upon the type of calciner employed, etc. The char was heat-treated by passing it through the calciner a second time at 1800°F.

The resulting char was separated into two portions. The control portion was ground in a Majac Mill with gun steam at 600°F. yielding 4.6 pounds (Black No. 1) of ground char black collected at the cyclone and 6.7 pounds (Black No. 2) collected in the fines bag connected to the steam outlet from the cyclone.

The other portion of char (15 pounds) was mixed with 0.3 pounds (2%) of powdered sulfur and ground under essentially the same conditions yielding 4.3 pounds (Black No. 3) of ground char black collected at the cyclone and 9.9 pounds (Black No. 4) collected at the fines bag. Sulfur has a vapor pressure of about 80 mm. at 600°F. and any that vaporized in the gun steam probably was cooled and was redeposited at least in part on the surface of the ground black in the classifier chamber (outlet temperature of 400°–420°F.), the cyclone and the fines bag.

These four ground blacks were all dried at about 210°F. to remove moisture condensed from the steam.

The sulfur-treated ground blacks described above, when compounded in rubber, both with and without adjustment of the recipe for sulfur content, gave improved stress-strain properties as shown in the following table.

The blacks were compounded in butadiene-styrene rubber, using GPF black as a control. The formulations and test results are recorded below.

Black No. 1 and Black No. 2 were controls and were not treated with sulfur. Black No. 3 and Black No. 4 were from the same char but were ground in the presence of sulfur. Black No. 1 and Black No. 3 were recovered as coarser material in a cyclone separator, and Black No. 2 and Black No. 4 were recovered in the fines bag. Both the coarser material and the fines were of a size suitable for use as a rubber-reinforcing black. Both were of such a size that none would be retained on a No. 10 mesh screen, and at least 50% would pass through a 325-mesh screen. Either material may be pelletized by any procedure known to the art.

All four blacks were mixed in the same recipe (columns A–D in the following table). The superiority of Black No. 3 and Black No. 4, which were ground in the presence of sulfur, over Black No. 1 and Black No. 2, respectively, with regard to tensile strength is clearly shown. To demonstrate that the superior tensile strength No. 3 and No. 4 is not merely the result of the presence of more sulfur, adjustments were made in the sulfur in the compounds that contain Blacks No. 3 and No. 4 in Columns E and F of the table. The assumption was made that the blacks contained 2% sulfur (0.8 part sulfur plus 40 parts unstabilized black), and the added sulfur was adjusted accordingly (1.75 part sulfur reduced to 0.95 part sulfur). The tensile properties recorded in Columns E and F are better than those recorded in Columns A and B, respectively. Actual sulfur analyses on the ground char blacks show that the sulfur added in grinding was concentrated on the sample collected in the fines bag (Black No. 4). Within normal experimental error of sulfur analyses Black No. 1 and Black No. 3 contain the same amount of sulfur, namely the combined sulfur in the original char. Black No. 3 nevertheless shows better reinforcing as a result of grinding in the presence of sulfur.

In the grinding of char to fine particles, carbon structures are shattered. It is believed that at least part of the reinforcing value of char black depends on the presence of free radical sites formed in the grinding. Protection of these active sites could improve or preserve the reinforcing properties. Since sulfur might react with free radicals (analogous to the reaction with oxygen), it might also preserve the active sites. Sulfur as a normal and inexpensive compounding ingredient is a reasonable additive. Under the conditions of grinding with 600°F. superheated steam, as described, sulfur should have a vapor pressure of about 80 mm. Residence time in the mill is great enough to allow vaporization. The sulfur could then redeposit on the ground char black particles in the cyclone and the fines bag. Whatever the mechanism, grinding the char in the presence of added sulfur improved the reinforcing properties of the ground char black. By analysis the char black from the fines bag contained most of the added sulfur.

TABLE

| Run No. | Control | Run No. 1 | Run No. 2 | Run No. 3 | Run No. 4 | Run No. 3 | Run No. 4 |
|---|---|---|---|---|---|---|---|
| Iodine No. | 37 | 95.8 | 94.5 | 87.0 | 80.9 | Sulfur adjusted in recipe | |
| Hand Oil absorption | 0.95 | 0.77 | 0.79 | 0.74 | 0.73 | | |
| Ash, % | | 13.4 | 10.3 | 9.30 | 7.05 | | |
| pH | | 9.18 | 7.60 | 2.6 | 7.3 | | |
| S Content, % | | 2.8 | 2.2 | 2.6 | 7.3 | | |
| | | A | B | C | D | E | F |
| S-1502 | 100 | 100 | 100 | 100 | 100 | 100 | 100 |
| GPF Black | 40 | — | — | — | — | — | — |
| Black No. 1 | — | 40 | — | — | — | — | — |
| Black No. 2 | — | — | 40 | — | — | — | — |
| Black No. 3 | — | — | — | 40 | — | 40.8 | — |
| Black No. 4 | — | — | — | — | 40 | — | 40.8 |
| ZnO | 3.0 | 3.0 | 3.0 | 3.0 | 3.0 | 3.0 | 3.0 |
| Stearic Acid | 1.0 | 1.0 | 1.0 | 1.0 | 1.0 | 1.0 | 1.0 |
| Medium Processing Oil | 1.7 | 1.7 | 1.7 | 1.7 | 1.7 | 1.7 | 1.7 |
| Sulfur | 1.75 | 1.75 | 1.75 | 1.75 | 1.75 | 0.95 | 0.95 |
| Santocure NS | 1.25 | 1.25 | 1.25 | 1.25 | 1.25 | 1.25 | 1.25 |
| | 148.70 | 148.70 | 148.70 | 148.70 | 148.70 | 148.70 | 148.70 |
| Monsanto Rheometer 300°F., 1° arc, 100 rpm, Mini Die | | | | | | | |
| Scorch, min. to TS (2) | 14.9 | 12.3 | 12.3 | 9.8 | 9.6 | 11.0 | 10.1 |
| Opt. Cure, min to TC (90) | 36.9 | 32.6 | 33.6 | 28.4 | 28.0 | 35.0 | 32.5 |
| Min. Torque, in.-lb. IP (L) | 6.8 | 7.4 | 6.4 | 7.0 | 6.3 | 7.2 | 7.0 |
| Torque at 90% Cure, in./lb. IP (90) | 33.3 | 33.5 | 32.1 | 34.2 | 35.1 | 29.0 | 31.7 |
| Max. Torque, in./lb. IP (100) | 36.3 | 36.4 | 35.0 | 37.3 | 38.3 | 31.5 | 34.5 |
| Cure Rate Index | 4.55 | 4.93 | 4.69 | 5.38 | 5.43 | 4.17 | 4.46 |
| Normal Stress-Strain Properties, Cured at 300°F. | | | | | | | |
| 300% Modulus, psi | | | | | | | |
| 15' | 175 | 300 | 350 | 675 | 825 | 450 | 550 |
| 23' | 925 | 825 | 825 | 1200 | 1400 | 775 | 925 |
| 30' | 1175 | 1025 | 1025 | 1275 | 1550 | 825 | 1100 |
| Tensile, psi | | | | | | | |
| 15' | 725 | 1650 | 2175 | 2750 | 2825 | 1975 | 2650 |
| 23' | 3225 | 2050 | 2250 | 2525 | 2700 | 2575 | 2800 |
| 30' | 3025 | 2100 | 2500 | 2500 | 2200 | 2675 | 2575 |
| Elongation, % | | | | | | | |
| 15' | 830 | 870 | 830 | 720 | 540 | 820 | 750 |
| 23' | 700 | 560 | 510 | 500 | 450 | 650 | 550 |
| 30' | 580 | 510 | 510 | 420 | 380 | 650 | 490 |
| Shore "A" Hardness - Compression Set Buttons Cured 30'/300°F. | | | | | | | |
| 73°F. | 55.0 | 55.0 | 55.0 | 54.5 | 56.0 | 54.0 | 53.5 |
| Steel Ball Rebound - Compression Set Buttons Cured 30'/300°F. | | | | | | | |
| 73°F. | 56.0 | 57.0 | 57.0 | 57.0 | 56.0 | 52.0 | 56.0 |
| 212°F. | 69.0 | 70.0 | 71.0 | 73.0 | 74.0 | 66.0 | 69.0 |
| Aged Stress-Strain Properties - Aged 4 days at 212°F., 23' cure/300°F. | | | | | | | |
| 300% Mod., psi | — | — | — | — | — | 1825 | — |
| 200% Mod., psi | 1375 | 1450 | 1375 | 1625 | — | 925 | 1325 |
| Tensile Strength, psi | 2250 | 1450 | 1375 | 1625 | 1550 | 2025 | 2025 |
| Retention, % | 70 | 71 | 61 | 64 | 57 | 78 | 72 |
| Elongation, % | 280 | 200 | 200 | 200 | 180 | 320 | 260 |
| Retention, % | 40 | 36 | 39 | 40 | 40 | 49 | 47 |

I claim:

1. The process of producing a reinforcing black from brittle carbonaceous material produced by the pyrolization of scrap rubber in the substantial absence of air, which process comprises grinding the carbonaceous material in a fluid-energy mill in an atmosphere of steam in the presence of 0.01 to 10 percent of sulfur based on the weight of the carbonaceous material, at an elevated temperature at which the sulfur has a vapor pressure of at least 1 mm. of mercury and not greater than 760 mm.

2. The process of claim 1 in which the carbonaceous material which is ground is char produced by the pyrolization in the absence of air of a selected portion of automobile tire scrap which is compounded with a reinforcing black.

* * * * *